United States Patent [19]

Gerhardinger et al.

[11] Patent Number: 5,624,481
[45] Date of Patent: Apr. 29, 1997

[54] PROCESS FOR THE WATER-REPELLENT IMPREGNATION OF PLASTER

[75] Inventors: Dieter Gerhardinger; Hans Mayer, both of Burghausen; Johannes Mittermeier, Altoetting, all of Germany

[73] Assignee: Wacker-Chemie GmbH, Munich, Germany

[21] Appl. No.: 713,589

[22] Filed: Sep. 13, 1996

Related U.S. Application Data

[63] Continuation of Ser. No. 447,574, May 23, 1995, abandoned.

[30] Foreign Application Priority Data

Jun. 1, 1994 [DE] Germany ............... 44 19 257.6

[51] Int. Cl.$^6$ .................. C09K 3/18; C04B 24/40
[52] U.S. Cl. .................. 106/2; 106/287.13; 106/287.14; 106/634; 106/781; 427/387
[58] Field of Search .................. 106/2, 287.13, 106/287.14, 781, 634; 427/387, 393.16, 421, 443.2

[56] References Cited

U.S. PATENT DOCUMENTS

| | | | |
|---|---|---|---|
| 2,813,085 | 11/1957 | MacMullen et al. | 524/650 |
| 3,455,710 | 7/1969 | Nitzsche et al. | 106/781 |
| 3,772,065 | 11/1973 | Seiler | 106/2 |
| 4,244,849 | 1/1981 | Saam | 106/2 |
| 4,648,904 | 3/1987 | DePasquale et al. | 106/287.14 |
| 4,999,249 | 3/1991 | Deschler et al. | 106/2 |
| 5,051,129 | 9/1991 | Cuthbert et al. | 106/2 |
| 5,074,912 | 12/1991 | Liles et al. | 106/2 |
| 5,091,002 | 2/1992 | Schamberg et al. | 106/287.14 |
| 5,112,393 | 5/1992 | Engel et al. | 106/2 |
| 5,135,805 | 8/1992 | Sellers et al. | 428/302 |
| 5,196,054 | 3/1993 | Schmuck et al. | 106/2 |
| 5,220,762 | 6/1993 | Lehnert et al. | 52/408 |
| 5,250,106 | 10/1993 | Roth et al. | 106/2 |
| 5,300,327 | 4/1994 | Stark-Kasley et al. | 106/2 |
| 5,314,533 | 5/1994 | Goebel et al. | 106/287.14 |
| 5,415,688 | 5/1995 | Gasmena et al. | 106/2 |
| 5,421,866 | 6/1995 | Stark-Kasley et al. | 106/2 |
| 5,443,633 | 8/1995 | Hirsbrunner et al. | 106/287.13 |

FOREIGN PATENT DOCUMENTS

| | | | |
|---|---|---|---|
| 639916 | 4/1962 | Canada. | |
| 0592206 | 4/1994 | European Pat. Off.. | |
| 2662171 | 11/1991 | France. | |
| 4124892 | 3/1992 | Germany. | |
| 4433864 | 2/1995 | Germany. | |
| 844273 | 8/1960 | United Kingdom | 106/2 |
| 949939 | 2/1964 | United Kingdom | 106/2 |
| 1177662 | 1/1970 | United Kingdom. | |
| 2244715 | 6/1994 | United Kingdom. | |

OTHER PUBLICATIONS

Chemical Abstracts vol. 103, (1985) Aug., No. 8, 58251u.

*Primary Examiner*—Anthony Green
*Attorney, Agent, or Firm*—Martin Connaughton

[57] ABSTRACT

Plaster is rendered water-repellent by impregnation with organosiloxanes containing Si-bonded hydrogen atoms and with alkali metal silicate. In particular, the water-repellent action is improved in the case of shaped plaster articles treated at high drying temperatures.

9 Claims, No Drawings

PROCESS FOR THE WATER-REPELLENT IMPREGNATION OF PLASTER

This application is a continuation of application Ser. No. 08/447,574, filed on May 23, 1995, and now abandoned.

FIELD OF INVENTION

The present invention relates to a process for the water-repellent impregnation of plaster by treatment with organosiloxane containing Si-bonded hydrogen atoms and alkali metal silicate.

BACKGROUND OF INVENTION

It is known from U.S. Ser. No. 3,455,710 that plaster can be given water-repellent properties by impregnation with organosiloxanes containing Si-bonded hydrogen atoms (H-siloxanes). This reference also describes the impregnation of mixtures of plaster and calcium hydroxide with H-siloxanes. Calcium hydroxide improves the water-repellent action of the H-siloxanes. However, calcium hydroxide is sparingly soluble in water and can therefore only be used in undesirably large amounts of water or as a slurry which is difficult to meter in.

The water-repellent action of H-siloxanes can also be improved by the addition of silanolates. However, large amounts of the relatively expensive silanolates are required.

In the mass production of shaped plaster articles, such as plaster wallboards and plaster/cardboard boards, a plaster slurry is usually prepared by mixing plaster with water, waterproofing agents and other additives, the slurry being subsequently dried. High drying temperatures shorten the passage times in continuous production lines. However, shaped plaster articles dried at 90° C. show a step increase in water absorption in comparison with shaped plaster articles dried at a lower temperature. In such shaped plaster articles the water-proofing using H-siloxanes is hardly effective any more. Shaped plaster articles containing H-siloxanes and calcium hydroxide also show an increased water absorption if they have been dried at 90° C.

SUMMARY OF INVENTION

It is the object of the present invention to provide a process for the water-repellent impregnation of plaster which does not have the above disadvantages.

The present invention provides a process for the water-repellent impregnation of plaster, comprising the treatment of the plaster with A organosiloxanes containing Si-bonded hydrogen atoms, and B alkali metal silicate.

The water-repellent action of the H-siloxanes is considerably improved by addition of alkali metal silicate. In particular, the water-repellent action is good in the case of shaped plaster articles treated by high drying temperatures.

The impregnation of the invention can be carried out using one H-siloxane or a mixture of a plurality of H-siloxanes. The H-siloxanes can be, for example, oils or resins. Particularly suitable are the H-siloxanes comprising units of the formula

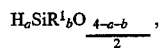

$$H_a SiR^1_b O_{\frac{4-a-b}{2}}, \qquad (I)$$

where $R^1$ is identical or different monovalent, unsubstituted or halogen-substituted $C_1$–$C_{15}$-hydrocarbon or hydrocarbonoxy radicals or hydroxyl groups, a is 0, 1, 2 or 3, on average from 0.0 1 to 1.2, in particular from 0.1 to 1, and b is 0, 1, 2 or 3, on average from 1.0 to 2.0, in particular from 1.4 to 1.8, with the proviso that at least one Si-bonded hydrogen atom is present per molecule.

Examples of the $C_1$–$C_{15}$-hydrocarbon radicals are alkyl radicals such as the methyl, ethyl, n-propyl, isopropyl,-n-butyl, isobutyl, tert-butyl, n-pentyl, isopentyl, neopentyl, tert-pentyl radical; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; alkenyl radicals such as the vinyl and the allyl radical; cycloalkyl radicals such as cyclopentyl, cyclohexyl, cycloheptyl radicals and methylcyclohexyl radicals; aryl radicals such as the phenyl, naphthyl, anthryl and phenanthryl radical; alkaryl radicals such as o-, m-, p-tolyl radicals; xylyl radicals and ethylphenyl radicals; aralkyl radicals such as the benzyl radical, the α- and the β-phenylethyl radical.

Examples of halogen-substituted $C_1$–$C_{15}$-hydrocarbon radicals are alkyl radicals substituted by fluorine, chlorine, bromine and iodine atoms, such as the 3,3,3-trifluoro-n-propyl radical, the 2,2,2,2',2',2'-hexafluoroisopropyl radical, the heptafluoroisopropyl radical, and haloaryl radicals such as the o-, m- and p-chlorophenyl radical.

Particular preference is given to the unsubstituted $C_1$–$C_6$-alkyl radicals, in particular the methyl radical and the phenyl radical.

Examples of the $C_1$–$C_{15}$-hydrocarbonoxy radicals are the above $C_1$–$C_{15}$-hydrocarbon radicals which are bonded to the silicon atom via a divalent oxygen atom. Preferably at most 5%, in particular none, of the radicals $R^1$ are hydrocarbonoxy radicals or hydroxyl groups.

The H-siloxanes preferably have a viscosity of at most 300 $mm^2$/s, in particular from 5 to 100 $mm^2$/s, at 25° C. Linear H-siloxanes are preferred. The hydrogen content is preferably from 0.05% to 5.0% by weight.

The H-siloxanes can be used with or without an organic solvent. Preferably, the H-siloxanes are used together with surfactants as an aqueous emulsion or aqueous foam.

Preference is the use of from 0.1 to 5 parts by weight, in particular from 0.2 to 2 parts by weight, of H-siloxane per 100 parts by weight of plaster.

As alkali metal silicate, preference is to use the sodium and potassium salts of silicic acids which are known as water glass.

The alkali metal silicates preferably have a molar ratio $SiO_2$:$M_2O$ of from 8.0 to 0.5, in particular from 5.0 to 1.5, where M is an alkali metal ion.

It is preferred to use from 0.05 to 5 parts by weight, in particular from 0.1 to 2 parts by weight, of alkali metal silicate per 100 parts by weight of plaster.

Among the types of plaster, preference is given to gypsum ($CaSO_4$.H2O) in the form of, for example, building plaster, stucco plaster or insulation plaster. However, the process of the invention is also suitable for the impregnation of other types of plaster, such as screed plaster, marble plaster and anhydrite. The calcium sulfate formed in flue gas desulfurization is also well suited. The plaster can contain additives which aid the production of shaped plaster articles or improve the properties of the shaped plaster articles. Additives are, for example, alkaline earth metal oxides or alkaline earth metal hydroxides, fillers such as silicon dioxide and cellulose fibers, accelerators such as potassium sulfate and aluminum sulfate, retardants such as proteins or tartaric acid salts, plasticizers for the plaster slurry, such as lignosulfonates and bonding agents for cardboard, such as starch.

The impregnation of the plaster can be carried out in bulk, i.e., H-siloxane and alkali metal silicate are incorporated into the plaster slurry prior to shaping the shaped articles, if desired together with other additives. The alkali metal silicates are readily soluble in water and in the impregnation in bulk can therefore be added to the dry plaster or to the plaster slurry as a powder or preferably as an aqueous solution. In the impregnation in bulk, the plaster used is preferably $CaSO_4.1/2\ H_2O$.

In the setting process of the plaster admixed with H-siloxane emulsion and potassium silicate solution, water is again sweated out. In the case of shaped articles having a sufficient bulk, this water emerges at the surface in the form of beads. Neither the mechanical properties of the shaped articles nor the setting time are significantly affected. The amount of water which emerges is from about 5% to 20% by weight of the water used. This water can be mechanically removed and preferably added to the makeup water of further batches, since it can still contain H-siloxane, other organosiloxanes, alkali metal silicate and other additives.

The water sweated out is part of the excess water in the shaped articles which is usually removed by drying. The water which can be mechanically removed does not have to be dried by heat treatment. This leads to a significant energy saving.

The impregnation of the plaster can, however, also be carried out after shaping, after setting or only after drying the shaped articles. The impregnation can, be applied by dipping, spraying or painting.

In the process of the invention, the weight ratios of H-siloxane to alkali metal silicate is preferably from 20:1 to 1:5, in particular from 6:1 to 1:1.

In the following Examples, unless otherwise indicated in each case, a all amounts are by weight;
b all pressures are 0.10 Mpa (abs.);
c all temperatures are 25° C.

EXAMPLE 1

(a) Production of the test specimens

A plaster slurry was prepared from 100 parts by weight of natural plaster ($CaSO_4.1/2\ H_2O$) and 80 parts by weight of water, with or without further parts by weight of additive, and was cast into circular molds to give test specimens having a diameter of 85 mm and a thickness of 6 mm. After 30 minutes, the solidified test specimens were removed from the molds and dried for 5 hours in a circulated air drying oven at the temperatures given in Table I.

Additives used were: H-siloxane emulsion: emulsion of 50 parts by weight of a polymethylhydrogensiloxane mixture having trimethylsilyl end blocks and the formula $(CH_3)_3SiO[SiH(CH_3)O]_xSi(CH_3)_3$ having x= from 45 to 90 and 2.5 parts by weight of a polyvinyl alcohol as emulsifier in 47.5 parts by weight of water.

Potassium silicate solution: solution of 28 parts by weight of a potassium silicate having a molar ratio of $SiO_2:K_2O$ of 3.8 in 72 parts by weight of water.

Calcium hydroxide as powder (b) Water absorption in accordance with DIN 18180

The test specimens were immersed in a horizontal position in water at 23° C. in such a way that the depth of water above the specimen surface was 50 mm. After storage in water for two hours, the test specimens were taken from the water, the water adhering to the surface was removed and the increase in mass was determined by weighing. The water absorption is given in Table I as a percentage by mass.

TABLE I

| Drying temperature [°C.] | Water absorption [%] | | | |
|---|---|---|---|---|
| | without additive | 1 part by weight of H-siloxane emulsion | 1 part by weight of calcium hydroxide + 1 part by weight of H-siloxane emulsion | 1 part by weight of potassium silicate solution + 1 part by weight of H-siloxane emulsion |
| 40 | 44.9 | 14.2 | 2.0 | 1.8 |
| 50 | 46.2 | 25.5 | 1.9 | 1.6 |
| 60 | 45.1 | 24.2 | 3.5 | 2.0 |
| 70 | 44.1 | 24.9 | 1.9 | 2.1 |
| 80 | 45.8 | 29.2 | 2.0 | 1.7 |
| 90 | 70.7 | 70.3 | 10.7 | 2.3 |

The water absorption of the test specimens produced using H-siloxane emulsion and potassium silicate solution is very small even after drying at 90° C.

EXAMPLE 2

(a) Production of the test specimens

A plaster slurry was prepared from 100 parts by weight of natural plaster ($CaSO_4.1/2\ H_2O$) and 80 parts by weight of water, with or without further parts by weight of additive, and was cast into molds to give cuboid-shaped test specimens having the dimensions 40 mm×40 mm×160 mm. After 30 minutes, the solidified test specimens were removed from the molds. Additives and setting behavior of the test specimens are given in Table II. The additives are described in Example 1.

In the setting process of the plaster admixed with H-siloxane emulsion and potassium silicate solution, water was sweated out again. This water emerged at the surface In the form of beads.

The test specimens were dried for 100 hours in a circulated-air drying oven at 40° C.

(b) Water absorption in accordance with DIN 18180

The test specimens were, as in Example 1, stored in water and freed of water adhering to the surface. The water absorption as a percentage by mass is given in Table II.

TABLE II

| | Water absorption [%] | Setting behavior |
|---|---|---|
| Without additive | 44.8 | No water sweated out |
| 1 part by weight of H-siloxane emulsion | 2.0 | No water sweated out |
| 1 part by weight of potassium silicate solution + 1 part by weight of H-siloxane emulsion | 0.8 | 8.2 parts by weight of water are sweated out; this corresponds to 10% by weight of the water used. |

What is claimed is:

1. A process for the water repellent impregnation of plaster comprising treating plaster with (A) from 0.1 to 5 parts by weight per 100 parts by weight of plaster of at least one H-siloxane and (B) from 0.05 to 5 parts by weight per 100 parts by weight of plaster of an alkali metal silicate.

2. The process as claimed in claim 1, wherein the at least one H-siloxane is built up of units of the formula $$H_a SiR^1{}_b O_{\frac{4-a-b}{2}} \quad (I)$$

where

R$^1$ is identical or different monovalent, unsubstituted or halogen-substituted $C_1$–$C_{15}$-hydrocarbon or hydrocarbonoxy radicals or hydroxyl groups, a is 0, 1, 2 or 3, and b is 0, 1, 2 or 3, with the proviso that at least one Si-bonded hydrogen atom is present per molecule.

3. The process as claimed in claim 1, wherein sodium and potassium salts of silicic acids are used as alkali metal silicate.

4. The process of claim 2, wherein a is on average from 0.01 to 1.2 for units of formula (1) from which at least one H-siloxane is built.

5. The process of claim 2, wherein a is on average from 0.1 to 1.0 for units of formula (1) from which at least one H-siloxane is built.

6. The process of claim 2, wherein b is on average from 1.0 to 2.0 for units of formula (1) from which at least one H-siloxane is built.

7. The process of claim 2, wherein b is on average from 1.4 to 1.8 for units of formula (1) from which at least one H-siloxane is built.

8. A process as claimed in claim 1, where at least one H-siloxane and the alkali metal silicate are added to an aqueous plaster slurry.

9. The process as claimed in claim 8 wherein at least one H-siloxane is in the form of an aqueous emulsion and the alkali metal silicate is in the form of an aqueous solution.

* * * * *